United States Patent
Cao et al.

(10) Patent No.: US 9,880,651 B2
(45) Date of Patent: Jan. 30, 2018

(54) INTEGRATED TOUCH CONTROL DISPLAY PANEL AND TOUCH DISPLAY DEVICE

(71) Applicants: Shanghai Tianma Micro-electronics Co., Ltd., Shanghai (CN); Shanghai AVIC OPTO Electronics Co., Ltd., Shanghai (CN); Tianma Micro-electronics Co., Ltd., Shenzhen (CN)

(72) Inventors: Zhaokeng Cao, Shanghai (CN); Wantong Shao, Shanghai (CN)

(73) Assignees: SHANGHAI TIANMA MICRO-ELECTRONICS CO., LTD., Shanghai (CN); SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 8 days.

(21) Appl. No.: 15/145,277

(22) Filed: May 3, 2016

(65) Prior Publication Data
US 2017/0160849 A1    Jun. 8, 2017

(30) Foreign Application Priority Data

Dec. 7, 2015   (CN) .......................... 2015 1 0895185

(51) Int. Cl.
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01); *G06F 3/044* (2013.01)

(58) Field of Classification Search
CPC ..... G06F 3/0412; G06F 3/044; G02F 1/13338
See application file for complete search history.

(56) References Cited

U.S. PATENT DOCUMENTS 9,653,033 B2 * 5/2017 Kobayashi ........... G09G 3/3648
2009/0262286 A1 * 10/2009 Nishida ............. G02F 1/133555
349/114

(Continued)

FOREIGN PATENT DOCUMENTS

CN         102566174 B        12/2014

*Primary Examiner* — Lixi C Simpson
(74) *Attorney, Agent, or Firm* — Anova Law Group, PLLC

(57) ABSTRACT

The present disclosure provides an integrated touch control display panel, including a substrate, a plurality of stripe shaped common electrodes sequentially arranged in a first direction and extending in a second direction intersecting with the first direction, and a plurality of common electrode slits located between any two adjacent stripe shaped common electrodes. Each section of the common electrode slit includes a first slit, a second slit, and a connection slit located between the first slit and the second slit. An orthogonal projection of a center line of the connection slit on the substrate is located inside or coincides with a triangle formed by an orthogonal projection of the intersection point of center lines of the first and second slits, the intersection point of center lines of the first and connection slits, and the intersection point of center lines of the second and connection slits on the substrate.

20 Claims, 6 Drawing Sheets

(56) References Cited

U.S. PATENT DOCUMENTS

2011/0222009 A1\* 9/2011 Itou .................. G02F 1/134363
 349/139
2013/0009094 A1\* 1/2013 Tamura .............. C09K 19/0275
 252/299.5

\* cited by examiner

INTEGRATED TOUCH CONTROL DISPLAY PANEL AND TOUCH DISPLAY DEVICE

CROSS-REFERENCES TO RELATED APPLICATIONS

This application claims the priority of Chinese Patent Application No. CN201510895185.1, filed on Dec. 7, 2015, the entire contents of which are incorporated herein by reference.

FIELD OF THE DISCLOSURE

The present disclosure generally relates to the touch control technologies and, more particularly, relates to an integrated touch control display panel and a touch display device.

BACKGROUND

With the advancement of modern electronic technologies, the display panel of display device may incorporate additional structures to support more functions. For example, touch control structure may be incorporated to support touch control function to provide users with application convenience.

Currently, to reduce the thickness of display panel and support touch control function at the same time, touch control structure is often integrated into display panel. When the capacitive touch control structure is used, the touch control electrodes of the capacitive touch control structure may be directly formed on the same substrate as the display structure. Such configuration may cause the need to make changes to the original components in the conventional display panels.

For example, the entire surface of common electrodes of conventional fringe field switching (FFS) display panels may be divided. The divided common electrodes may operate as touch control driving electrodes in the touch control phase. To improve viewing angles, FFS mode display panels may often adopt the dual-domain structure or the pseudo dual-domain structure. According to the present disclosure, to accommodate the dual-domain structure or the pseudo dual-domain structure, the divided common electrodes may need further design adaptation. It is likely that the dividing slits in the dual-domain structure may bend. Such dividing method may likely cause defects where adjacent divided common electrodes may not be completely separated and may occasionally cause short-circuit. Thus, the production yield may be reduced substantially.

The disclosed integrated touch control display panel and touch display device are directed to solve one or more problems in the art.

BRIEF SUMMARY OF THE DISCLOSURE

Directed to solve one or more problems set forth above and other problems in the art, the present disclosure provides an integrated touch control display panel and a touch display device.

One aspect of the present disclosure includes an integrated touch control display panel. The integrated touch control display panel includes a substrate, a plurality of stripe shaped common electrodes sequentially arranged in a first direction and extending in a second direction intersecting with the first direction, and a plurality of common electrode slits located between any two adjacent stripe shaped common electrodes. Each section of the common electrode slit includes a first slit, a second slit, and a connection slit located between the first slit and the second slit. A center line of the first slit intersects with a center line of the neighboring second slit at a first point. The center line of the first slit intersects with a center line of the connection slit at a second point. The center line of the second slit intersects with the center line of the connection slit at a third point. An orthogonal projection of the center line of the connection slit on the substrate is located inside or coincides with a triangle formed by an orthogonal projection of the first point, the second point and, the third point on the substrate.

Another aspect of the present disclosure includes a touch display device. The touch display device includes the disclosed integrated touch control display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
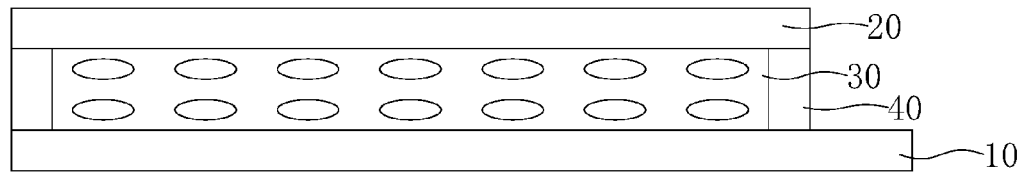
FIG. 1 illustrates a cross-sectional view of an exemplary integrated touch control display panel according to the disclosed embodiments.

FIG. 1 illustrates a cross-sectional view of an exemplary integrated touch control display panel according to one embodiment of the present disclosure. Referring to FIG. 1, the integrated touch control display panel may include an array substrate 10, a counter substrate 20 configured facing toward the array substrate 10, and a liquid crystal layer 30 sandwiched between the array substrate 10 and the counter substrate 20. The array substrate 10 may be bonded with the counter substrate 20 by a sealant frame 40.

In one embodiment, a plurality of stripe shaped common electrodes may be configured on the array substrate 10. During the display phase, a common voltage may be supplied to the common electrodes. Electric field may be formed between the common electrodes and the pixel electrodes to rotate liquid crystals to display images. During the touch control phase, touch control driving voltages may be supplied to the individual common electrode. Touch control detecting electrodes may be configured on the counter substrate 20 to detect touch control signals to calculate touch control positions.

Figure 2:
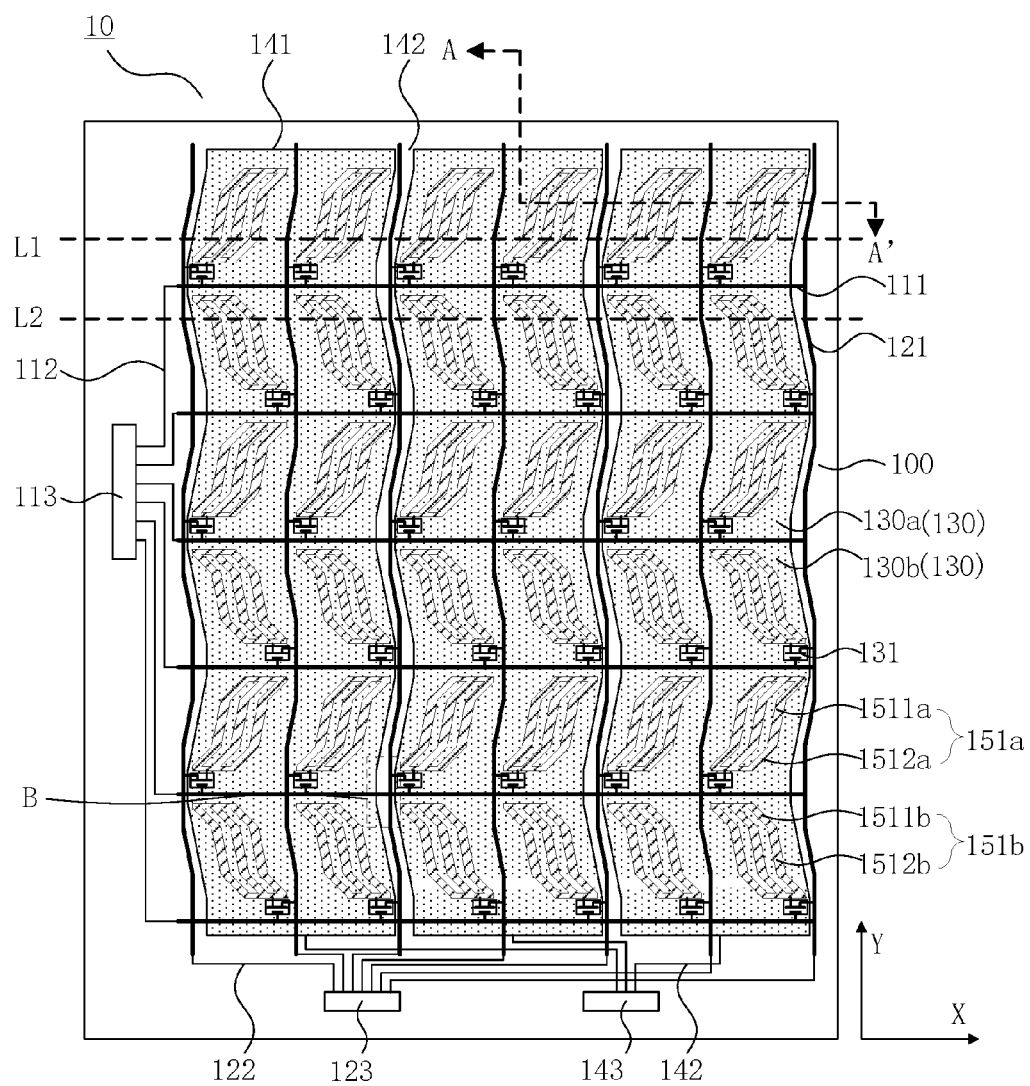
FIG. 2 illustrates a top view of the array substrate in FIG. 1.
Figure 3:
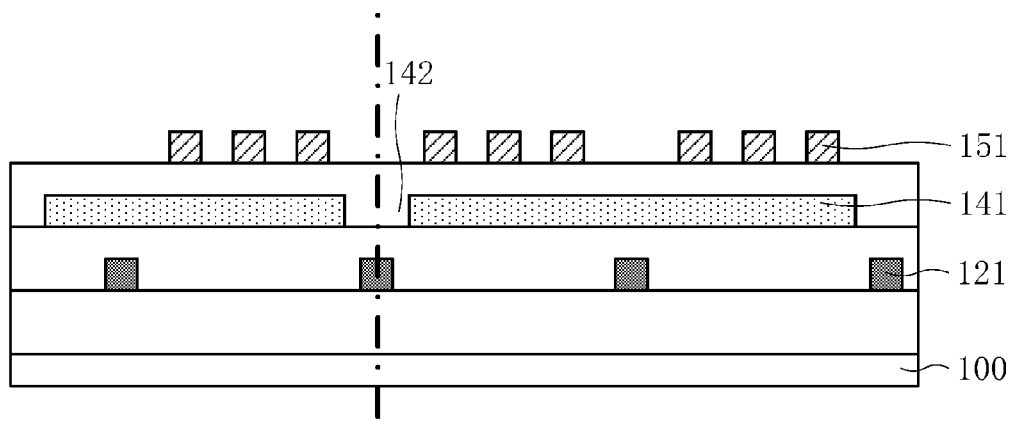
FIG. 3 illustrates a cross-sectional view along the AA' line in FIG. 2.
Figure 4:
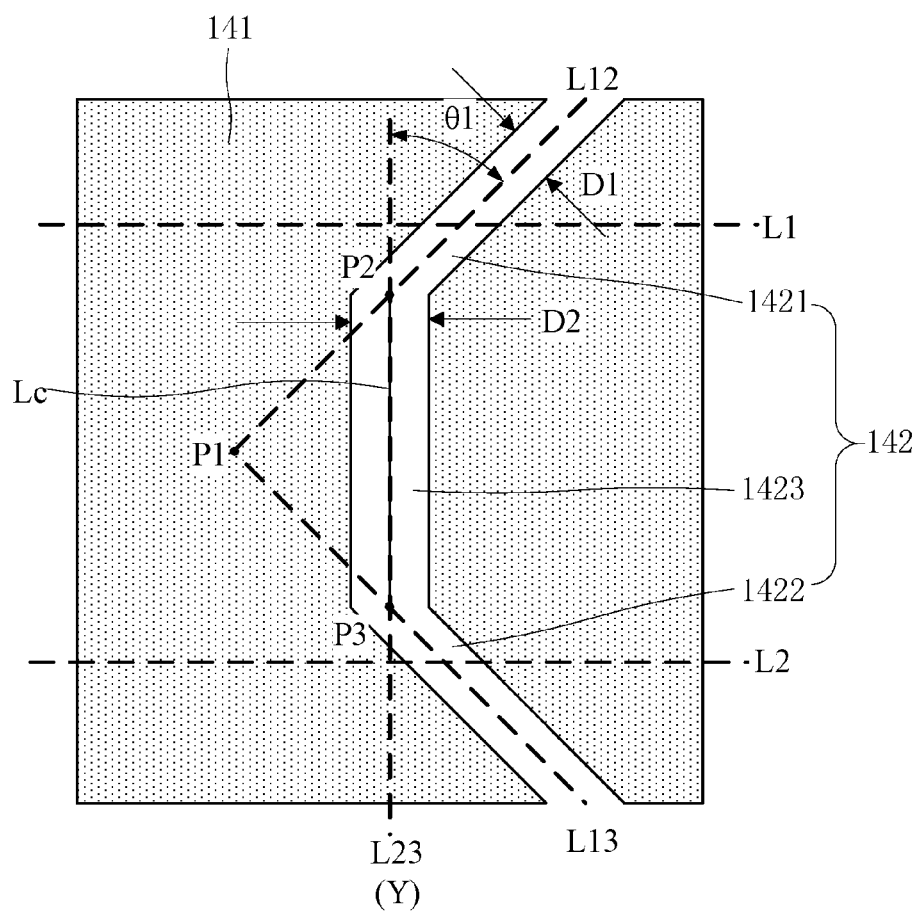
FIG. 4 illustrates a close-up view of B region in FIG. 2.

The array substrate 10 may be illustrated from various perspectives in FIGS. 2-4. FIG. 2 illustrates a top view of the array substrate in FIG. 1. FIG. 3 illustrates a cross-sectional view along the AA' line in FIG. 2. FIG. 4 illustrates a close-up view of B region in FIG. 2. Referring to FIG. 2, the array substrate 10 of the integrated touch control display panel according to the present disclosure may include a substrate 100. A plurality of scanning lines 111 and a plurality of data lines 121 may be configured on the substrate 100. The plurality of the scanning lines 111 may intersect with the plurality of the data lines 121 to form a plurality of pixel units 130.

The scanning lines 111 may extend in a first direction X. The data lines 121 may extend in a second direction Y. The first direction X may be perpendicular to the second direction Y. The plurality of the pixel units 130 may include a plurality of first pixel units 130a and a plurality of second pixel units 130b that are arranged next to each other along the second direction Y. Each first pixel unit 130a may include a first pixel electrode 151a. Each first pixel electrode 151a may include a first straight portion 1511a and two first bent portions 1512a. The two first bent portions 1512a may be located on both ends of the first straight portion 1511a. Each second pixel unit 130b may include a second pixel electrode 151b. Each second pixel electrode 151b may include a second straight portion 1511b and two second bent portions 1512b. The two second bent portions 1512b may be located on both ends of the second straight portion 1511b.

The extension direction of the first straight portion 1511a and the extension direction of the second straight portion 1511b may be symmetrical with respect to the second direction Y. The two first bent portions 1512a located on both ends of the first straight portion 1511a may extend in the same direction. The absolute value of the angle between the extension direction of the first bent portions 1512a and the second direction Y may be greater than the absolute value of the angle between the extension direction of the first straight portion 1511a and the second direction Y. The two second bent portions 1512b located on both ends of the second straight portion 1511b may extend in the same direction. The absolute value of the angle between the extension direction of the second bent portions 1512b and the second direction Y may be greater than the absolute value of the angle between the extension direction of the second straight portion 1511b and the second direction Y. The extension direction of the first bent portions 1512a and the extension direction of the second bent portions 1512b may be symmetrical with respect to the second direction Y.

In one embodiment, the array substrate 10 may include a plurality of the stripe shaped common electrodes 141. The stripe shaped common electrodes 141 may extend in the second direction Y and may be sequentially arranged in the first direction X. During the touch control phase, the stripe shaped common electrodes 141 may operate as touch control driving electrodes. The array substrate 10 may also include a plurality of common electrode slits 142 that are located between any two adjacent stripe shaped common electrodes 141. Referring to FIG. 4, each section of the common electrode slit 142 may include a first slit 1421, a second slit 1422, and a connection slit 1423 that is located between the first slit 1421 and the second slit 1422 and connects between the first slit 1421 and the second slit 1422.

The first slit 1421 may extend in the same direction as the first straight portion 1511a extends and the second slit 1422 may extend in the same direction as the second straight portion 1511b extends. The center line of the first slit 1421 and the center line of the neighboring second slit 1422 may extend and intersect at a first point P1. The center line of the first slit 1421 may intersect with the center line of the connection slit 1423 at a second point P2. The center line of the second slit 1422 may intersect with the center line of the connection slit 1423 at a third point P3. The orthogonal projection of the center line of the connection slit 1423 on the substrate 100 may fall inside or coincide with the triangle formed by the orthogonal projection of the first point P1, the second point P2 and, the third point P3 on the substrate 100.

Referring to FIG. 2, the array substrate 10 may only include an array of 6*6 pixel units 130 for illustration purpose. The scope of the present disclosure is not limited by this specific configuration. In one embodiment, the extension in the first direction X of the scanning lines 111 may refer to that the overall extension direction is parallel with the first direction X. The individual sections of the scanning lines 111 may be bent. Similarly, the extension in the second direction Y of the data lines 121 may refer to that the overall extension direction is parallel with the second direction Y. The individual sections of the data lines 121 may be bent. For example, to improve viewing angles, the pixel electrodes may be bent. In this case, the data lines 121 may be bent accordingly. However, the data lines 121 may still extend in the direction that is perpendicular to the extension direction of the scanning lines 111.

In one embodiment, two adjacent data lines 121 may intersect with two adjacent scanning lines 111 to define a pixel unit 130. Each pixel unit 130 may include a thin film transistor 131. The thin film transistor 131 may be an amorphous silicon thin film transistor or a polysilicon thin film transistor. The thin film transistor 131 may be disposed at the intersection of the data line 121 and the scanning line 111. In addition, the thin film transistor 131 may have the gate electrode electrically connected to a scanning line 111, the source electrode electrically connected to a data line 121, and the drain electrode electrically connected to the pixel electrode 151. When the corresponding scanning line 111 opens, the signal on the data line 121 may be transmitted to the pixel electrode 151.

The plurality of the pixel units 130 may include a plurality of adjacent first pixel unit 130a and second pixel unit 130b that is arranged in the second direction Y. The first pixel unit 130a may include the first pixel electrode 151a and the second pixel unit 130b may include the second pixel electrode 151b. Referring to FIG. 2, the pixel electrodes 151 may include electrodes that are inclined toward the right along the second direction Y and electrodes that inclined toward the left along the second direction Y. The right inclined pixel electrodes may be defined as first pixel electrodes 151a and the left inclined pixel electrodes may be defined as second pixel electrodes 151b. In other embodiments, the first pixel electrodes 151a and the second pixel electrodes 151b may be inclined differently. The pixel electrode inclination is not limited by the scope of present disclosure. The pixel electrodes that are inclined to two different directions may produce different electric fields when coupled with the common electrodes to control the liquid crystals to rotate in different directions in order to improve the viewing angles.

The first pixel electrode 151a may include the first straight portion 1511a and the first bent portions 1512a. The first bent portions 1512a may be located at both ends of the first straight portion 1511a. The first bent portions 1512a located at both ends of the first straight portion 1511a may extend in the same direction. The second pixel electrode 151b may include the second straight portion 1511b and the second bent portions 1512b. The second bent portions 1512b may be located at both ends of the second straight portion 1511b. The second bent portions 1512b located at both ends of the second straight portion 1511b may extend in the same direction.

The extension direction of the first straight portion 1511a and the extension direction of the second straight portion 1511b may be essentially symmetrical with respect to the second direction Y. The extension direction of the first bent portions 1512a and the extension direction of the second bent portions 1512b may be essentially symmetrical with respect to the second direction Y. Because the first direction X is perpendicular to the second direction Y, when the extension direction of the first straight portion 1511a and the extension direction of the second straight portion 1511b are symmetrical with respect to the second direction Y, the extension direction of the first straight portion 1511a and the extension direction of the second straight portion 1511b are also symmetrical with respect to the first direction X. Similarly, the extension direction of the first bent portions 1512a and the extension direction of the second bent portions 1512b are also symmetrical with respect to the first direction X. The symmetrical configuration of the first straight portion 1511a and the second straight portion 1511b may improve the uniformity of the liquid crystal display panels.

The absolute value of the angle between the extension direction of the first bent portions 1512a and the second direction Y may be greater than the absolute value of the angle between the extension direction of the first straight portion 1511a and the second direction Y. The absolute value of the angle between the extension direction of the second bent portions 1512b and the second direction Y may be greater than the absolute value of the angle between the extension direction of the second straight portion 1511b and the second direction Y. Because the first straight portion 1511a is inclined toward the right along the second direction Y, the angle between the first straight portion 1511a and the second direction Y may be positive. Similarly, because the second straight portion 1511b is inclined toward the left along the second direction Y, the angle between the second straight portion 1511 and the second direction Y may be negative. Whether the angle is positive or negative indicates the angle inclination. The absolute value of the angle indicates how wide the angle is.

The absolute value of the angle between the extension direction of the first bent portions 1512a and the second direction Y may be greater than the absolute value of the angle between the first straight portion 1511a and the second direction Y. That is, the first bent portions 1512a may be inclined at a wider angle than the first straight portion 1511a. Similarly, the second bent portions 1512b may be inclined at a wider angle than the second straight portion 1511b.

As shown in FIG. 2, the orthogonal projection of the end points of the center line of the first straight portion 1511a that is arranged in the first direction X on the substrate 100 may coincide with the first line L1. The orthogonal projection of the end points of the center line of the second straight portion 1511b that is arranged in the first direction X on the substrate 100 may coincide with the second line L2. That is, all the first straight portions 1511a may have equal length and all the second straight portions 1511b may have equal length. In this case, the center line may be defined as the connected center points of the shortest connecting lines between two contour lines that are formed by extending any section of the electrode in the second direction Y. The first straight portion 1511a, the second straight portion 1511b, the first bent portions 1512a, and the second bent portions 1512b may have equal width in the first direction X.

The first bent portions 1512a and the second bent portions 1512b may have large inclination angles. By using geometry deduction, it is known that the distance between two adjacent first bent portions 1512a is smaller than the distance between two adjacent first straight portions 1511a, and the distance between two adjacent second bent portions 1512b is smaller than the distance between two adjacent second straight portions 1511b. Because the distance between two adjacent bent portions is smaller than the distance between two adjacent straight portions, when the same voltage is applied, the electric field intensity at the bent portions may be greater than the electric field intensity at the straight portions, and may have stronger driving force to rotate the liquid crystals. Thus, the display defects at the end portions in the pixel units 130 may be avoided.

The plurality of the stripe shaped common electrodes 141 may extend in the second direction Y. As shown in FIG. 2, three stripe shaped common electrodes 141 extend in the second direction Y. Each stripe shaped common electrode 141 corresponds to two columns of pixel units 130. This specific configuration is for illustration purposes. In other embodiments, each stripe shaped common electrode 141 may correspond to multiple columns of pixel units 130. Similar to the data lines, the extension direction of the common electrodes 141 in the second direction Y may indicate the overall extension direction. In specific product designs, the common electrodes 141 may be bent to accommodate different pixel unit configurations in the display panels. The plurality of the stripe shaped common electrodes 141 may be sequentially arranged in the first direction X.

In one embodiment, as shown in FIG. 2, the plurality of the scanning lines 111 may be connected to the scanning driver circuit 113 through the scanning connection lines 112. The plurality of the data lines 121 may be connected to the data driver circuit through the data connection lines 122. The plurality of the stripe shaped common electrodes 141 may be connected to the common electrode driver circuit 143 through the common electrode connection lines 142. The gate electrode driver circuit 113 may be the integrated driver circuit or the amorphous silicon driver circuit. During the display phase, the common electrode driver circuit 143 may supply the common electrode signals to the plurality of the stripe shaped common electrodes 141. The common electrodes 141 may be coupled with the pixel electrodes 151 to form the electric field to rotate the liquid crystals to display images. During the touch control phase, the plurality of the stripe shaped common electrodes 141 may operate as the touch control driving electrodes. The common electrode driver circuit 143 may supply the touch control driving signals to the each common electrode 141, respectively.

For illustration purpose, the dimensions and angles of various components shown in FIG. 2 and FIG. 4 may be exaggerated. To illustrate the configurations of the common electrodes and common electrode slits, pixel electrodes, thin film transistors, and scanning lines, etc., are omitted in FIG. 4 though these components may still be found in FIG. 2. Such drawing arrangement is not limiting the scope of the present disclosure.

In one embodiment, the array substrate 10 may include the plurality of common electrode slits 142. Each common electrode slit 142 may be located between two adjacent stripe shaped common electrodes 141. Each common electrode slit 142 may include a first slit 1421, a second slit 1422 and a connection slit 1423. The connection slit 1423 may be located between the adjacent first slit 1421 and second slit 1422. The first slit 1421 may extend in the same direction as the first straight portion 1511a extends. The second slit 1422 may extend in the same direction as the second straight portion 1511b extends. The first slit 1421 may be configured corresponding to the first straight portion 1511a and may incline toward the left along the second direction Y. The connection slit 1423 may be configured corresponding to the intersection between the first pixel unit 130a and the second pixel unit 130b. Specifically, "corresponding" indicates that at least one of the two adjacent end points of the two center lines of the adjacent first slit 141 and second slit 142 may have the orthogonal projection on the substrate 100 fall between the first line L1 and the second line L2. In this case, the center line may be defined as the connected center points of the shortest connecting lines between two contour lines that are formed by extending any section of the electrode in the second direction Y.

Referring to FIG. 4, the center line of the first slit 1421 and the center line of the neighboring second slit 1422 may extend and intersect at the first point P1. The center line of the first slit 1421 may intersect with the center line of the connection slit 1423 at the second point P2. The center line of the second slit 1422 may intersect with the center line of the connection slit 1423 at the third point P3. The center line of the first slit 1421 may be L12. The center line of the second slit 1422 may be L13. The center line of the connection slit 1423 may be Lc. L12 and L13 may intersect at the first point P1. L12 and Lc may intersect at the second point P2. L13 and Lc may intersect at the third point P3. Connecting between the second point P2 and the third point P3 may obtain the connection line L23.

In one embodiment, the connection slit 1423 may be a straight line. The absolute value of the angle between the extension direction of the center line Lc of the connection slit 1423 and the second direction Y may be smaller than or equal to the absolute value of the angle between the extension direction of the center line L12 of the first slit 1421 and the second direction Y. Specifically, the absolute value of the angle between the extension direction of the center line Lc of the connection slit 1423 and the second direction Y may be 0. The absolute value of the angle between the extension direction of the center line L12 of the first slit 1421 and the second direction Y may be |θ1|. 0 is smaller than |θ1|. That is, the orthogonal projection of the center line Lc of the connection slit 1423 on the substrate 100 may coincide with the connection line L23, and the connection line L23 may extend in the second direction Y.

In other embodiments, the straight line type connection slit may extend in other direction, and the absolute value of the angle between the extension direction of the center line Lc of the connection slit and the second direction Y may be smaller than or equal to the absolute value of the angle between the extension direction of the center line L12 of the first slit and the second direction Y.

The orthogonal projection of the center line Lc of connection slit 1423 excluding the end points on the substrate 100 may coincide with the triangle formed by connecting the orthogonal projection of the first point P1, the second point P2 and the third point P3 on the substrate. The orthogonal projection of the first point P1, the second point P2 and the third point P3 on the substrate may be connected to form a triangle ΔP1P2P3. The orthogonal projection of the center line Lc of connection slit 1423 excluding the end points on the substrate 100 may coincide with one side P2P3 of the triangle ΔP1P2P3.

Specifically, as shown in FIG. 4, in the integrated touch control display panel according to the present disclosure, the connection slit 1423 may have a width D2, and the first slit 1421 may have a width D1. D2 is greater than D1. The connection slit 1423 may have wider width than the first slit 1421. The first slit 1421 and the second slit 1422 may have equal width. The width of the connection slit 1423 may be greater than the width of either the first slit 1421 or the second slit 1422. When forming the common electrodes, such slit configuration may prevent adjacent stripe shaped common electrodes 141 from getting shorted due to insufficient etching around the bending corners. Thus, the production yield may be improved.

Further, in one embodiment, the orthogonal projection of the second point P2 and the third point P3 on the substrate 100 may be located between the first line L1 and the neighboring second line L2. As shown in FIG. 4, when the orthogonal projection of the second point P2 and the third point P3 on the substrate 100 is located between the first point L1 and the neighboring second line L2, the first slit 1421 of the first straight portion 1511a may have a length in the second direction Y greater than the length of the first straight portion 1511a in the second direction Y, and the second slit 1422 of the second straight portion 1511b may have a length in the second direction Y greater than the length of the second straight portion 1511b in the second direction Y. During the image display phase, the first slit 1421 and the second slit 1422 may be coupled with the pixel electrodes to form a stable electric field to avoid poor image display near the connection slit 1423.

In certain other embodiments, at least one of the adjacent second point P2 and third point P3 may have an orthogonal projection on the substrate located between the first line L1 and the adjacent second line L2. This is because at least one thin film transistor 131 may be configured between one first pixel unit 130a and one adjacent second pixel unit 130b. As shown in FIG. 2, the thin film transistor 131 may be located at the bottom of the pixel unit 130. For example, a scanning line 111 is located between adjacent first straight portion 1511a and second straight portion 1511b. The distance between the first straight portion 1511a and the scanning line 111 may be different from the distance between the second straight portion 1511b and the scanning line 111.

Because the first slit 1421 and the second slit 1422 are configured corresponding to the first straight portion 1511a and the second straight portion 1511b, one of the second point P2 and the third point P3 may be located outside the region between the first line L1 and the second line L2. However, as long as the orthogonal projection of the center Lc of the connection slit 1423 excluding the end points on the substrate 100 coincides with or is located inside the triangle formed by the orthogonal projection of the first point P1, the second point P2 and the third point P3 on the substrate 100, the potential short circuits between two adjacent stripe shaped common electrodes 141 caused by the insufficient etching at the corner may be avoided. Thus, the production yield may be improved.

Further, in the integrated touch control display panel according to the present disclosure, the orthogonal projection of the center lines of the first slit 1421 and the second slit 1422 on the substrate 100 may coincide with the orthogonal projection of the center line of the data line 121.

Referring to FIG. 3, the dot-dash line may connect the center line of the common electrode slit 142 and the center line of the data line 121, and may evenly divide the common electrode slit 142 and the data line 121 into two equal portions on the left and the right. The dot-dash line may be perpendicular to the substrate 100.

In other words, the orthogonal projection of the center lines of the first slit 1421 and the second slit 1422 on the substrate 100 may coincide with the orthogonal projection of the center line of the data line 121 on the substrate 100. The orthogonal projection of the center line of the connection slit 1423 on the substrate 100 may or may not coincide with the orthogonal projection of the center line of the data line 121 on the substrate 100. Without reducing the aperture of the pixel unit 130, such configuration may prevent the potential short-circuit between two adjacent stripe shaped common electrodes 141. Thus, the desired production yield and the desired pixel unit aperture may be achieved at the same time.

Specifically, referring to FIG. 2 and FIG. 4, in the integrated touch control display panel according to the present disclosure, the total number of the first slits 1421 and the second slits 1422 may be M for each common electrode slit 142, and the number of the connection slits 1423 may be N. N≥0.95M, wherein M and N are positive integers. The reason for this guideline is explained in the following.

The connection slits 1423 may be located between the first slits 1421 and the second slits 1422. Generally, a display panel may include a display region and a non-display region. Due to the constraints in the fabrication and the application, special considerations may be taken to enhance the electric field between the common electrodes and the pixel electrodes in the display region. For example, the slits between the common electrodes may be altered to match the protrusion pattern in the bent portions of the pixel electrodes. In this case, a third slit that is different from the connection slit 1423 may be configured between the first slit 1421 and the second slit 1422 to connect the first slit 1421 and the second slit 1422. Thus, the number of connection slits 1423 may be smaller than or equal to the total number of the first slits 1421 and the second slits 1422. In order to ensure the insulation between adjacent stripe shaped common electrodes 141, the number of the connection slits 1423 may not be smaller than 95% of the total number of the first slits 1421 and the second slits 1422, i.e., N≥0.95M.

Moreover, each common electrode slit 142 may have A number of the first slits 1421 and B number of the second slits 1422, wherein A=B, A=2K, and K is a positive integer. That is, the first slits 1421 and the second slits 1422 appear in pairs. Such configuration may ensure that the first slits 1421 and the second slits 1422 are configured to match the corresponding pixel electrodes. The slits between two adjacent first lines L1 may be parallel with the first straight portions 1511a of the pixel electrodes, and the slits between two adjacent second lines L2 may be parallel with the second straight portions of the pixel electrodes. Thus, uneven display may be avoided and the pixel aperture may be increased.

In the integrated touch control display panel according to the present disclosure, the orthogonal projection of the center lines of the connection slits on the substrate excluding the end points may coincide with the triangle formed by the orthogonal projection of the first point P1, the second point P2, and the third point P3. Such configuration may widen the gap at the junction where the slits bend to reduce the risk of short circuits between adjacent stripe shape common electrodes, and may ensure the display quality of the display panels. In addition, such configuration may improve the production yield without compromising the display quality.

Figure 5:
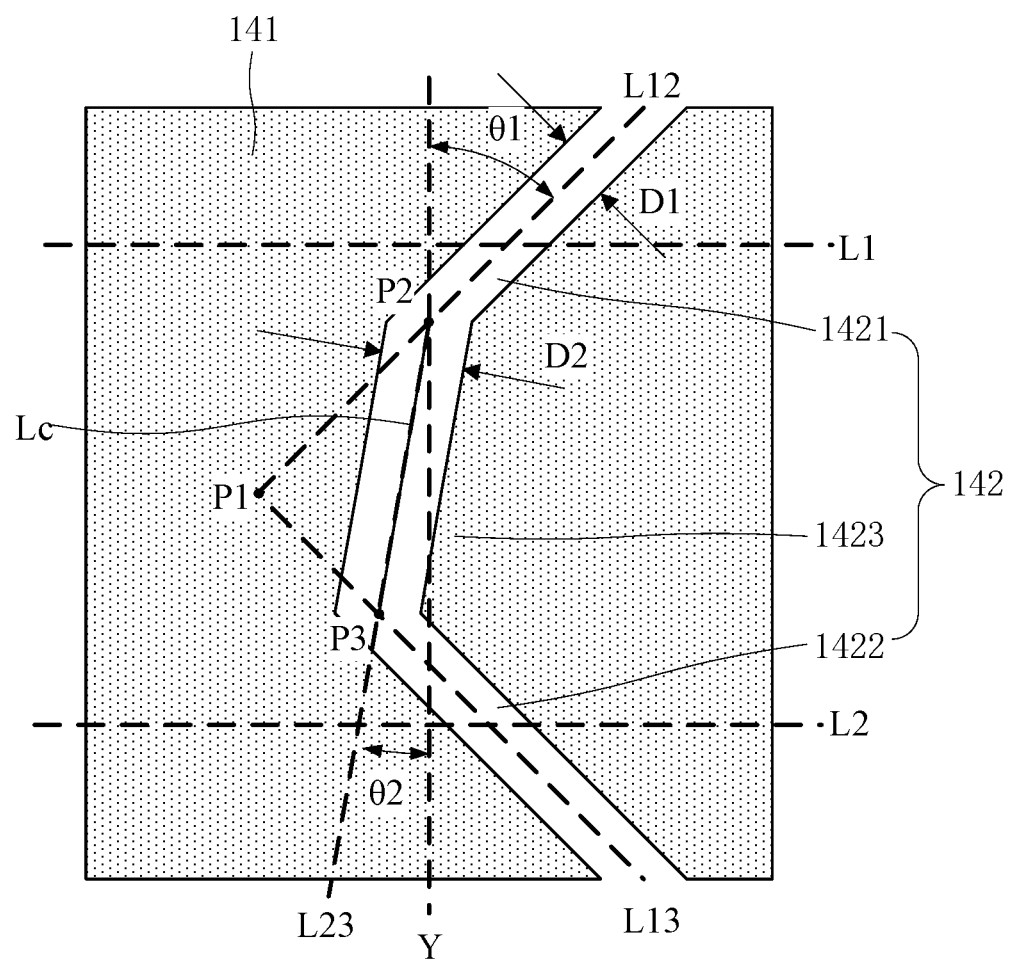
FIG. 5 illustrates a close-up view of another B region in FIG. 2.

FIG. 5 illustrates a close-up view of another B region in FIG. 2. Referring to FIGS. 2, 3 and 5, the array substrate 10 of the integrated touch control display panel according to the present disclosure may include a substrate 100. The plurality of the scanning lines 111 and the plurality of the data lines 121 may be configured on the substrate 100. The plurality of the scanning lines 111 may intersect with the plurality of the data lines 121 to form the plurality of the pixel units 130.

The scanning lines 111 may extend in the direction X. The data lines 121 may extend in the second direction Y. The first direction X may be perpendicular to the second direction Y. Each pixel unit 130 may include the first pixel unit 130a and the second pixel unit 130b that are arranged next to each other along the second direction Y. Each first pixel unit 130a may include the first pixel electrode 151a. Each first pixel electrode 151a may include the first straight portion 1511a and the two first bent portions 1512a. The two first bent portions 1512a may be located on both ends of the first straight portion 1511a. Each second pixel unit 130b may include the second pixel electrode 151b. Each second pixel electrode 151b may include the second straight portion 1511b and the two second bent portions 1512b. The two second bent portions 1512b may be located on both ends of the second straight portion 1511b.

The extension direction of the first straight portion 1511a and the extension direction of the second straight portion 1511b may be symmetrical with respect to the second direction Y. The two first bent portions 1512a located on both ends of the first straight portion 1511a may extend in the same direction. The absolute value of the angle between the extension direction of the first bent portions 1512a and the second direction Y may be greater than the absolute value of the angle between the extension direction of the first straight portion 1511a and the second direction Y. The two second bent portions 1512b located on both ends of the second straight portion 1511b may extend in the same direction. The absolute value of the angle between the extension direction of the second bent portions 1512b and the second direction Y may be greater than the absolute value of the angle between the extension direction of the second straight portion 1511b and the second direction Y. The extension direction of the first bent portions 1512a and the extension direction of the second bent portions 1512b may be symmetrical with respect to the second direction Y.

In one embodiment, the array substrate 10 may include the plurality of the stripe shaped common electrodes 141. The stripe shaped common electrodes 141 may extend in the second direction Y and may be sequentially arranged in the first direction X. During the touch control phase, the stripe shaped common electrodes 141 may operate as the touch control driving electrodes. The array substrate 10 may also include the plurality of common electrode slits 142 that are located between any two adjacent stripe shaped common electrodes 141. Each section of the common electrode slit 142 may include the first slit 1421, the second slit 1422, and the connection slit 1423 that is located between the first slit 1421 and the second slit 1422 and connects between the first slit 1421 and the second slit 1422.

The first slit 1421 may extend in the same direction as the first straight portion 1511a extends and the second slit 1422 may extend in the same direction as the second straight portion 1511b extends. The center line of the first slit 1421 and the center line of the neighboring second slit 1422 may extend and intersect at the first point P1. The center line of the first slit 1421 may intersect with the center line of the connection slit 1423 at the second point P2. The center line of the second slit 1422 may intersect with the center line of the connection slit 1423 at the third point P3. The orthogonal projection of the center line of the connection slit 1423 on the substrate 100 may fall coincide with the triangle formed by the orthogonal projection of the first point P1, the second point P2, and the third point P3 on the substrate 100.

Specifically, the configuration of the common electrode slit 142 shown in FIG. 5 may be different from the configuration of the common electrode slit 142 shown in FIG. 4. Other related structures may be the same as what have been shown in FIG. 2.

Referring to FIG. 5, the center line of the first slit 1421 and the center line of the second slit 1422 may extend and intersect at a first point P1. The center line of the first slit 1421 may intersect with the center line of the connection slit 1423 at a second point P2. The center line of the second slit 1422 may intersect with the center line of the connection slit 1423 at a third point P3. The center line of the first slit 1421 may be L12. The center line of the second slit 1422 may be L13. The center line of the connection slit 1423 may be Lc. L12 and L13 may intersect at the first point P1. L12 and Lc may intersect at the second point P2. L13 and Lc may intersect at the third point P3. Connecting the second point P2 and the third point P3 may form a connection line L23 between the second point P2 and the third point P3.

In one embodiment, the connection slit 1423 is a straight line. The absolute value of the angle between the extension direction of the center line Lc of the connection slit 1423 and the second direction Y may be smaller than or equal to the absolute value of the angle between the extension direction of the center line L12 of the first slit and the second direction Y. Specifically, the absolute value of the angle between the extension direction of the center line Lc of the connection slit 1423 and the second direction Y may be |θ2|, and the absolute value of the angle between the extension direction of the center line L12 of the first slit 1421 and the second direction Y may be |θ1|. |θ2| may be smaller than |θ1|.

The orthogonal projection of the center line Lc of the connection slit 1423 on the substrate 100 excluding the end points may coincide with the triangle formed by the orthogonal projection of the first point P1, the second point P2, and the third point P3 on the substrate 100. The orthogonal projection of the first point P1, the second point P2, and the third point P3 may form the triangle ΔP1P2P3. The center line Lc of the connection slit 1423 excluding the end points may coincide with one side P2P3 of the triangle ΔP1P2P3.

Specifically, in the integrated touch control display panel according to the present disclosure, the connection slit 1423 may have a width D2. The first slit 1421 may have a width D2. D2 may be greater than or equal to D1. That is, the width of the connection slit 1423 may be greater than or equal to the width of the first slit 1421. The width of the first slit 1421 may be equal to the width of the second slit 1422. The width of the connection slit 1423 may be greater than or equal to the width of the first slit 1421 or the second slit 1422. In the process of fabricating the common electrodes 141, such configuration may prevent the short circuits between two adjacent stripe shaped common electrodes 141 at the corners due to insufficient etching, and may improve the production yield.

Specifically, in one embodiment, the orthogonal projection of the second point P2 and the third point P3 on the substrate 100 may be located between the adjacent first line L1 and second line L2. As shown in FIG. 5, when the orthogonal projection of the second point P2 and the third point P3 on the substrate 100 may be located between the adjacent first line L1 and second line L2, the length of the first slit 1421 corresponding to the first straight portion 1511*a* in the second direction Y may be greater than the length of the first straight portion 1511*a* in the second direction Y, and the length of the second slit 1422 corresponding to the second straight portion 1511*b* in the second direction Y may be greater than the length of the second straight portion 1511*b* in the second direction Y. During the image display phase, the first slit 1421 and the second slit 1422 may be coupled with the pixel electrode to form a stable electric field, which prevents uneven display near the connection slit 1423.

Similar to certain other embodiments, the integrated touch control display panel according to the present disclosure may have the orthogonal projection of the center lines of the first slit 1421 and the second slit 1422 on the substrate 100 coincide with the orthogonal projection of the center line of the data line 121 on the substrate 100. The total number of the first slits 1421 and the second slits 1422 may be M for each common electrode slit 142, and the number of the connection slits 1423 may be N. N≥0.95M, wherein M and N are positive integers. Further, the first slits 1421 and the second slits 1422 may appear in pairs. The detail description may be referred to certain other embodiments.

In the integrated touch control display panel according to the present disclosure, the orthogonal projection of the center lines of the connection slits on the substrate excluding the end points may coincide with the triangle formed by the orthogonal projection of the first point P1, the second point P2, and the third point P3. Such configuration may widen the gap at the junction where the slits bend to reduce the risk of short circuits between adjacent stripe shape common electrodes, and may ensure the display quality of the display panels. In addition, such configuration may improve the production yield without compromising the display quality.

Figure 6:
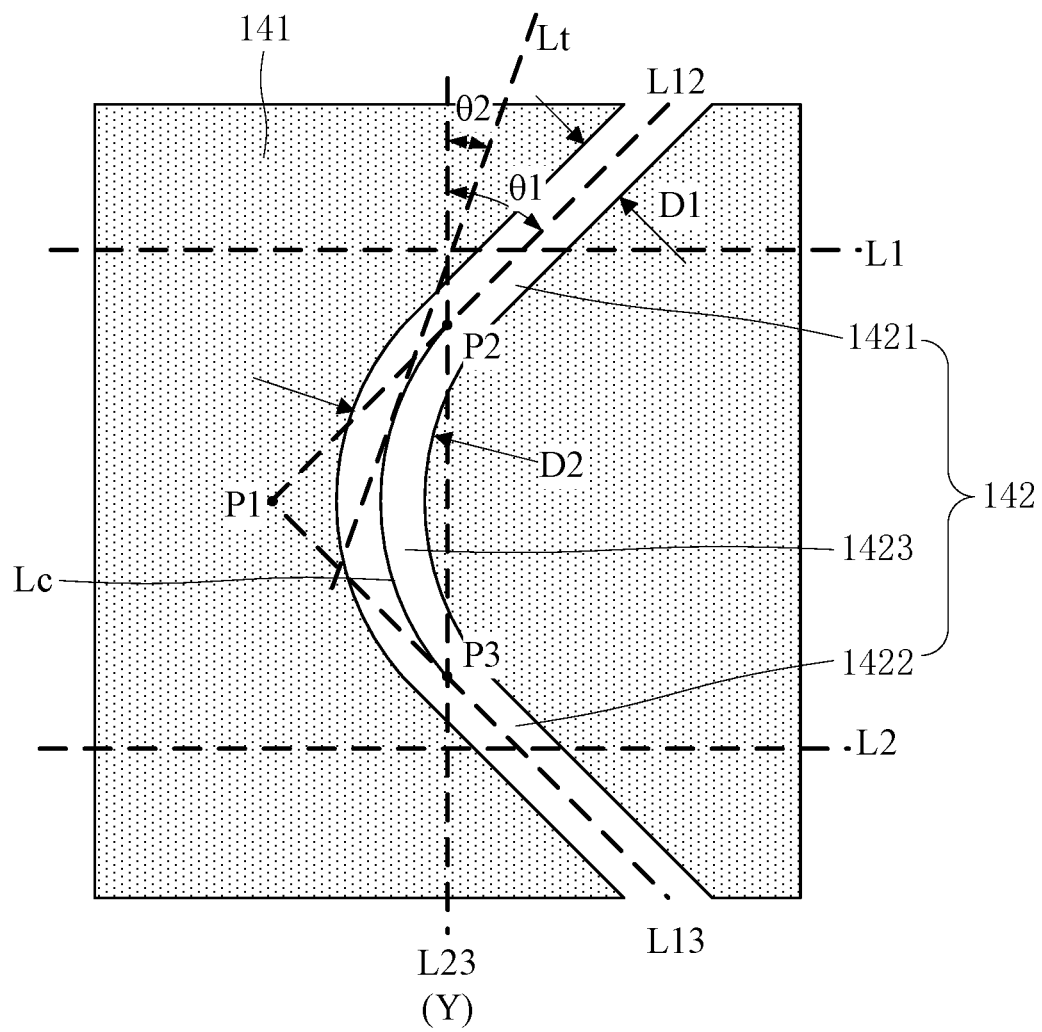
FIG. 6 illustrates a close-up view of another B region in FIG. 2.

FIG. 6 illustrates a close-up view of another B region in FIG. 2. Referring to FIGS. 2, 3 and 6, the array substrate 10 of the integrated touch control display panel according to the present disclosure may include a substrate 100. The plurality of the scanning lines 111 and the plurality of the data lines 121 may be configured on the substrate 100. The plurality of the scanning lines 111 may intersect with the plurality of the data lines 121 to form the plurality of the pixel units 130.

The scanning lines 111 may extend in the direction X. The data lines 121 may extend in the second direction Y. The first direction X may be perpendicular to the second direction Y. Each pixel unit 130 may include the first pixel unit 130*a* and the second pixel unit 130*b* that are arranged next to each other along the second direction Y. Each first pixel unit 130*a* may include the first pixel electrode 151*a*. Each first pixel electrode 151*a* may include the first straight portion 1511*a* and the two first bent portions 1512*a*. The two first bent portions 1512*a* may be located on both ends of the first straight portion 1511*a*. Each second pixel unit 130*b* may include the second pixel electrode 151*b*. Each second pixel electrode 151*b* may include the second straight portion 1511*b* and the two second bent portions 1512*b*. The two second bent portions 1512*b* may be located on both ends of the second straight portion 1511*b*.

The extension direction of the first straight portion 1511*a* and the extension direction of the second straight portion 1511*b* may be symmetrical with respect to the second direction Y. The two first bent portions 1512*a* located on both ends of the first straight portion 1511*a* may extend in the same direction. The absolute value of the angle between the extension direction of the first bent portions 1512*a* and the second direction Y may be greater than the absolute value of the angle between the extension direction of the first straight portion 1511a and the second direction Y. The two second bent portions 1512b located on both ends of the second straight portion 1511b may extend in the same direction. The absolute value of the angle between the extension direction of the second bent portions 1512b and the second direction Y may be greater than the absolute value of the angle between the extension direction of the second straight portion 1511b and the second direction Y. The extension direction of the first bent portions 1512a and the extension direction of the second bent portions 1512b may be symmetrical with respect to the second direction Y.

In one embodiment, the array substrate 10 may include the plurality of the stripe shaped common electrodes 141. The stripe shaped common electrodes 141 may extend in the second direction Y and may be sequentially arranged in the first direction X. During the touch control phase, the stripe shaped common electrodes 141 may operate as the touch control driving electrodes. The array substrate 10 may also include the plurality of common electrode slits 142 that are located between any two adjacent stripe shaped common electrodes 141. Each section of the common electrode slit 142 may include the first slit 1421, the second slit 1422, and the connection slit 1423 that is located between the first slit 1421 and the second slit 1422 and connects between the first slit 1421 and the second slit 1422.

The first slit 1421 may extend in the same direction as the first straight portion 1511a extends and the second slit 1422 may extend in the same direction as the second straight portion 1511b extends. The center line of the first slit 1421 and the center line of the neighboring second slit 1422 may extend and intersect at the first point P1. The center line of the first slit 1421 may intersect with the center line of the connection slit 1423 at the second point P2. The center line of the second slit 1422 may intersect with the center line of the connection slit 1423 at the third point P3. The orthogonal projection of the center line of the connection slit 1423 on the substrate 100 may fall inside the triangle formed by the orthogonal projection of the first point P1, the second point P2, and the third point P3 on the substrate 100.

Specifically, the configuration of the common electrode slit 142 shown in FIG. 6 may be different from the configuration of the common electrode slit 142 shown in FIG. 4. All other related structures may be the same as what have been shown in FIG. 2.

Referring to FIG. 6, the center line of the first slit 1421 and the center line of the second slit 1422 may extend and intersect at a first point P1. The center line of the first slit 1421 may intersect with the center line of the connection slit 1423 at a second point P2. The center line of the second slit 1422 may intersect with the center line of the connection slit 1423 at a third point P3. The center line of the first slit 1421 may be L12. The center line of the second slit 1422 may be L13. The center line of the connection slit 1423 may be Lc. L12 and L13 may intersect at the first point P1. L12 and Lc may intersect at the second point P2. L13 and Lc may intersect at the third point P3. Connecting the second point P2 and the third point P3 may form a connection line L23 between the second point P2 and the third point P3.

In one embodiment, the connection slit 1423 is a curved line. The absolute value of the angle between the extension direction of the tangent line at any point of the center line Lc of the connection slit 1423 and the second direction Y may be smaller than or equal to the absolute value of the angle between the extension direction of the center line L12 of the first slit and the second direction Y. Specifically, the tangent line Lt shown in FIG. 6 may be used for illustration purpose. The absolute value of the angle between the extension direction of the tangent line Lt and the second direction Y may be |θ2|, and the absolute value of the angle between the extension direction of the center line L12 of the first slit 1421 and the second direction Y may be |θ1|. |θ2| may be smaller than |θ1|.

Similar to the angle between the extension direction of the pixel electrodes and the second direction Y, the angle between the extension direction of the tangent line at any point of the center line Lc of the connection slit 1423 and the second direction Y may be either positive or negative. When the angle is positive, the tangent line Lt may be inclined to the right along the second direction Y. When the angle is negative, the tangent line Lt may be inclined to the left along the second direction Y. The positive and negative signs of the angle may indicate the inclination direction of the angle. The absolute value of the angle may indicate the size of the angle.

The angle θ2 between the tangent line at any point of the curved center line Lc of the connection slit 1423 and the second direction Y may increase or decrease monotonically. When the curved center line Lc of the connection slit 1423 extends from the second point P2 through the third point P3, the angle θ2 between the extension direction of the tangent line Lt and the second direction Y may start from a positive value, gradually decrease to zero, and continue to decrease as a negative value. That is, the angle θ2 decrease monotonically. When the curved center line Lc of the connection slit 1423 extends from the third point P3 through the second point P2, the angle θ2 between the extension direction of the tangent line Lt and the second direction Y may start from a negative value, gradually increase to zero, and continue to increase as a positive value. That is, the angle θ2 increases monotonically.

The orthogonal projection of the center line Lc of the connection slit 1423 on the substrate 100 excluding the end points may be located inside the triangle formed by the orthogonal projection of the first point P1, the second point P2, and the third point P3 on the substrate 100. The orthogonal projection of the first point P1, the second point P2, and the third point P3 may form the triangle ΔP1P2P3. The center line Lc of the connection slit 1423 excluding the end points may be located inside the triangle ΔP1P2P3.

Specifically, in the integrated touch control display panel according to the present disclosure, the connection slit 1423 may have a width D2. The first slit 1421 may have a width D2. D2 may be greater than or equal to D1. That is, the width of the connection slit 1423 may be greater than or equal to the width of the first slit 1421. The width of the first slit 1421 may be equal to the width of the second slit 1422. The width of the connection slit 1423 may be greater than or equal to the width of the first slit 1421 or the second slit 1422. In the process of fabricating the common electrodes 141, such configuration may prevent the short circuits between two adjacent stripe shaped common electrodes 141 at the corners due to insufficient etching, and may improve the production yield.

Specifically, in one embodiment, the orthogonal projection of the second point P2 and the third point P3 on the substrate 100 may be located between the adjacent first line L1 and second line L2. As shown in FIG. 6, when the orthogonal projection of the second point P2 and the third point P3 on the substrate 100 may be located between the adjacent first line L1 and second line L2, the length of the first slit 1421 corresponding to the first straight portion 1511a in the second direction Y may be greater than the length of the first straight portion 1511a in the second direction Y, and the length of the second slit 1422 corresponding to the second straight portion 1511*b* in the second direction Y may be greater than the length of the second straight portion 1511*b* in the second direction Y. During the image display phase, the first slit 1421 and the second slit 1422 may be coupled with the pixel electrode to form a stable electric field, which prevents uneven display near the connection slit 1423.

Similar to certain other embodiments, the integrated touch control display panel according to the present disclosure may have the orthogonal projection of the center lines of the first slit 1421 and the second slit 1422 on the substrate 100 coincide with the orthogonal projection of the center line of the data line 121 on the substrate 100. The total number of the first slits 1421 and the second slits 1422 may be M for each common electrode slit 142, and the number of the connection slits 1423 may be N. N≥0.95M, wherein M and N are positive integers. Further, the first slits 1421 and the second slits 1422 may appear in pairs. The detail description may be referred to certain other embodiments.

In the integrated touch control display panel according to the present disclosure, the orthogonal projection of the center lines of the connection slits on the substrate excluding the end points may coincide with the triangle formed by the orthogonal projection of the first point P1, the second point P2, and the third point P3. Such configuration may widen the gap at the junction where the slits bend to reduce the risk of short circuits between adjacent stripe shape common electrodes, and may ensure the display quality of the display panels. In addition, such configuration may improve the production yield without compromising the display quality.

Figure 7:
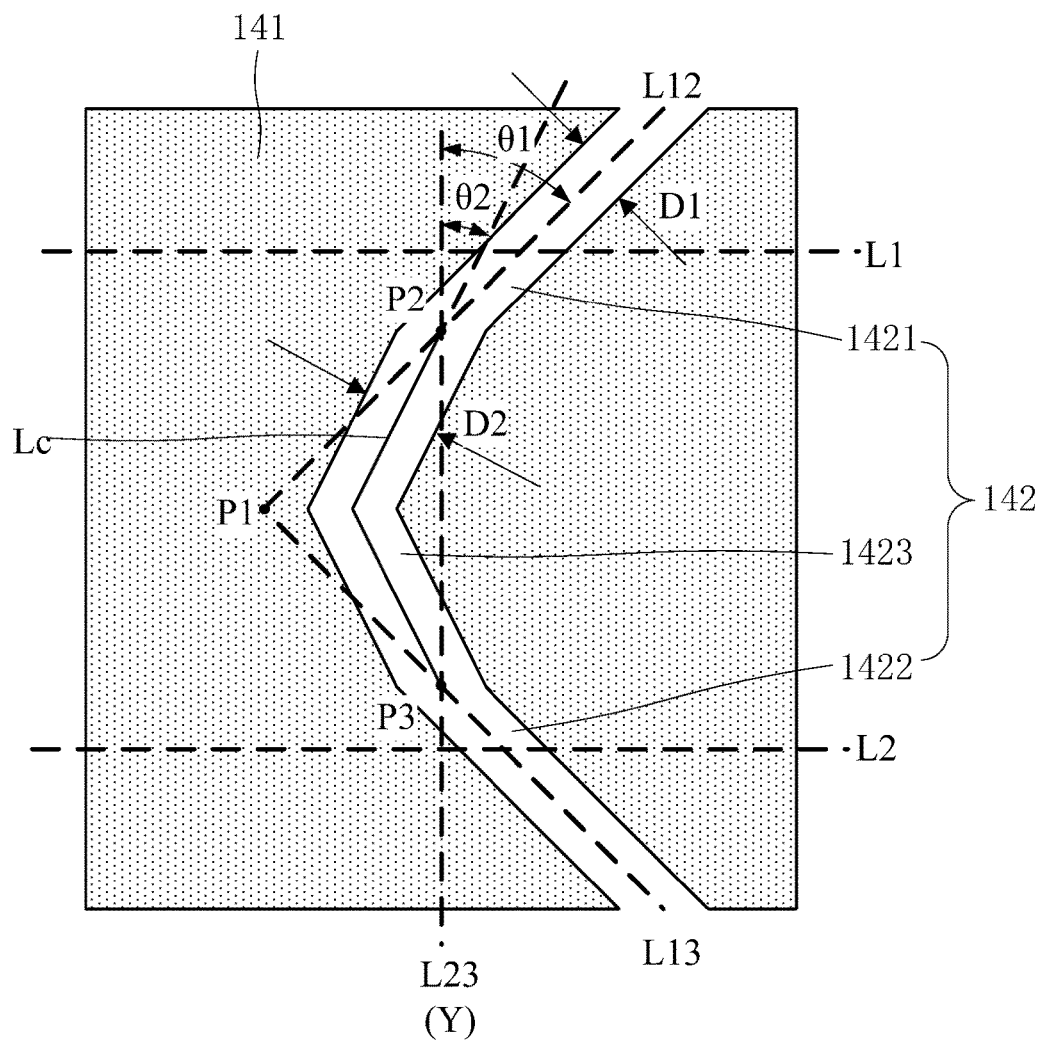
FIG. 7 illustrates a close-up view of another B region in FIG. 2.

FIG. 7 illustrates a close-up view of another B region in FIG. 2. Referring to FIGS. 2, 3 and 7, the array substrate 10 of the integrated touch control display panel according to the present disclosure may include a substrate 100. The plurality of the scanning lines 111 and the plurality of the data lines 121 may be configured on the substrate 100. The plurality of the scanning lines 111 may intersect with the plurality of the data lines 121 to form the plurality of the pixel units 130.

The scanning lines 111 may extend in the direction X. The data lines 121 may extend in the second direction Y. The first direction X may be perpendicular to the second direction Y. Each pixel unit 130 may include the first pixel unit 130*a* and the second pixel unit 130*b* that are arranged next to each other along the second direction Y. Each first pixel unit 130*a* may include the first pixel electrode 151*a*. Each first pixel electrode 151*a* may include the first straight portion 1511*a* and the two first bent portions 1512*a*. The two first bent portions 1512*a* may be located on both ends of the first straight portion 1511*a*. Each second pixel unit 130*b* may include the second pixel electrode 151*b*. Each second pixel electrode 151*b* may include the second straight portion 1511*b* and the two second bent portions 1512*b*. The two second bent portions 1512*b* may be located on both ends of the second straight portion 1511*b*.

The extension direction of the first straight portion 1511*a* and the extension direction of the second straight portion 1511*b* may be symmetrical with respect to the second direction Y. The two first bent portions 1512*a* located on both ends of the first straight portion 1511*a* may extend in the same direction. The absolute value of the angle between the extension direction of the first bent portions 1512*a* and the second direction Y may be greater than the absolute value of the angle between the extension direction of the first straight portion 1511*a* and the second direction Y. The two second bent portions 1512*b* located on both ends of the second straight portion 1511*b* may extend in the same direction. The absolute value of the angle between the extension direction of the second bent portions 1512*b* and the second direction Y may be greater than the absolute value of the angle between the extension direction of the second straight portion 1511*b* and the second direction Y. The extension direction of the first bent portions 1512*a* and the extension direction of the second bent portions 1512*b* may be symmetrical with respect to the second direction Y.

In one embodiment, the array substrate 10 may include the plurality of the stripe shaped common electrodes 141. The stripe shaped common electrodes 141 may extend in the second direction Y and may be sequentially arranged in the first direction X. During the touch control phase, the stripe shaped common electrodes 141 may operate as the touch control driving electrodes. The array substrate 10 may also include the plurality of common electrode slits 142 that are located between any two adjacent stripe shaped common electrodes 141. Each section of the common electrode slit 142 may include the first slit 1421, the second slit 1422, and the connection slit 1423 that is located between the first slit 1421 and the second slit 1422 and connects between the first slit 1421 and the second slit 1422.

The first slit 1421 may extend in the same direction as the first straight portion 1511*a* extends and the second slit 1422 may extend in the same direction as the second straight portion 1511*b* extends. The center line of the first slit 1421 and the center line of the neighboring second slit 1422 may extend and intersect at the first point P1. The center line of the first slit 1421 may intersect with the center line of the connection slit 1423 at the second point P2. The center line of the second slit 1422 may intersect with the center line of the connection slit 1423 at the third point P3. The orthogonal projection of the center line of the connection slit 1423 on the substrate 100 excluding the end points may fall inside the triangle formed by the orthogonal projection of the first point P1, the second point P2, and the third point P3 on the substrate 100.

Specifically, the configuration of the common electrode slit 142 shown in FIG. 7 may be different from the configuration of the common electrode slit 142 shown in FIG. 4. Other related structures may be the same as what have been shown in FIG. 2.

Referring to FIG. 7, the center line of the first slit 1421 and the center line of the second slit 1422 may extend and intersect at a first point P1. The center line of the first slit 1421 may intersect with the center line of the connection slit 1423 at a second point P2. The center line of the second slit 1422 may intersect with the center line of the connection slit 1423 at a third point P3. The center line of the first slit 1421 may be L12. The center line of the second slit 1422 may be L13. The center line of the connection slit 1423 may be Lc. L12 and L13 may intersect at the first point P1. L12 and Lc may intersect at the second point P2. L13 and Lc may intersect at the third point P3. Connecting the second point P2 and the third point P3 may form a connection line L23 between the second point P2 and the third point P3.

In one embodiment, the connection slit 1423 is a bent line. The absolute value of the angle between the extension direction of each section of the center line Lc of the connection slit 1423 and the second direction Y may be smaller than or equal to the absolute value of the angle between the extension direction of the center line L12 of the first slit and the second direction Y. Specifically, as shown in FIG. 7, the connection slit 1423 may include two sections of straight lines. The upper section of the center line of the connection slit 1423 may be used for illustration. The absolute value of the angle between the extension direction of the upper section of the center line and the second direction Y may be |θ2|, and the absolute value of the angle between the extension direction of the center line L12 of the first slit 1421 and the second direction Y may be |θ1|. |θ2| may be smaller than |θ1|.

Similar to the angle between the extension direction of the pixel electrodes and the second direction Y, the angle between the extension direction of each section of the center line Lc of the connection slit 1423 and the second direction Y may be either positive or negative. When the angle is positive, the extension direction of the section of the center line Lc may be inclined to the right along the second direction Y. When the angle is negative, the extension direction of the section of the center line Lc may be inclined to the left along the second direction Y. The positive and negative signs of the angle may indicate the inclination direction of the angle. The absolute value of the angle may indicate the size of the angle.

The angle θ2 between the tangent line at any point of the bent center line Lc of the connection slit 1423 and the second direction Y may increase or decrease monotonically. When the bent center line Lc of the connection slit 1423 extends from the second point P2 through the third point P3, the angle θ2 between the extension direction of the tangent line Lt and the second direction Y may start from a positive value, gradually decrease to zero, and continue to decrease as a negative value. That is, the angle θ2 decreases monotonically. When the bent center line Lc of the connection slit 1423 extends from the third point P3 through the second point P2, the angle θ2 between the extension direction of the tangent line Lt and the second direction Y may start from a negative value, gradually increase to zero, and continue to increase as a positive value. That is, the angle θ2 increases monotonically.

The orthogonal projection of the center line Lc of the connection slit 1423 on the substrate 100 excluding the end points may be located inside the triangle formed by the orthogonal projection of the first point P1, the second point P2, and the third point P3 on the substrate 100. The orthogonal projection of the first point P1, the second point P2, and the third point P3 may form the triangle ΔP1P2P3. The center line Lc of the connection slit 1423 excluding the end points may be located inside the triangle ΔP1P2P3.

Specifically, in the integrated touch control display panel according to the present disclosure, the connection slit 1423 may have a width D2. The first slit 1421 may have a width D2. D2 may be greater than or equal to D1. That is, the width of the connection slit 1423 may be greater than or equal to the width of the first slit 1421. The width of the first slit 1421 may be equal to the width of the second slit 1422. The width of the connection slit 1423 may be greater than or equal to the width of the first slit 1421 or the second slit 1422. In the process of fabricating the common electrodes 141, such configuration may prevent the short circuits between two adjacent stripe shaped common electrodes 141 at the corners due to insufficient etching, and may improve the production yield.

Specifically, in one embodiment, the orthogonal projection of the second point P2 and the third point P3 on the substrate 100 may be located between the adjacent first line L1 and second line L2. As shown in FIG. 7, when the orthogonal projection of the second point P2 and the third point P3 on the substrate 100 may be located between the adjacent first line L1 and second line L2, the length of the first slit 1421 corresponding to the first straight portion 1511*a* in the second direction Y may be greater than the length of the first straight portion 1511*a* in the second direction Y, and the length of the second slit 1422 corresponding to the second straight portion 1511*b* in the second direction Y may be greater than the length of the second straight portion 1511*b* in the second direction Y. During the image display phase, the first slit 1421 and the second slit 1422 may be coupled with the pixel electrode to form a stable electric field, which prevents uneven display near the connection slit 1423.

Similar to certain other embodiments, the integrated touch control display panel according to the present disclosure may have the orthogonal projection of the center lines of the first slit 1421 and the second slit 1422 on the substrate 100 coincide with the orthogonal projection of the center line of the data line 121 on the substrate 100. The total number of the first slits 1421 and the second slits 1422 may be M for each common electrode slit 142, and the number of the connection slits 1423 may be N. N≥0.95M, wherein M and N are positive integers. Further, the first slits 1421 and the second slits 1422 may appear in pairs. The detail description may be referred to certain other embodiments.

In the integrated touch control display panel according to the present disclosure, the orthogonal projection of the center lines of the connection slits on the substrate excluding the end points may coincide with the triangle formed by the orthogonal projection of the first point P1, the second point P2, and the third point P3. Such configuration may widen the gap at the junction where the slits bend to reduce the risk of short circuits between adjacent stripe shape common electrodes, and may ensure the display quality of the display panels. In addition, such configuration may improve the production yield without compromising the display quality.

Figure 8:
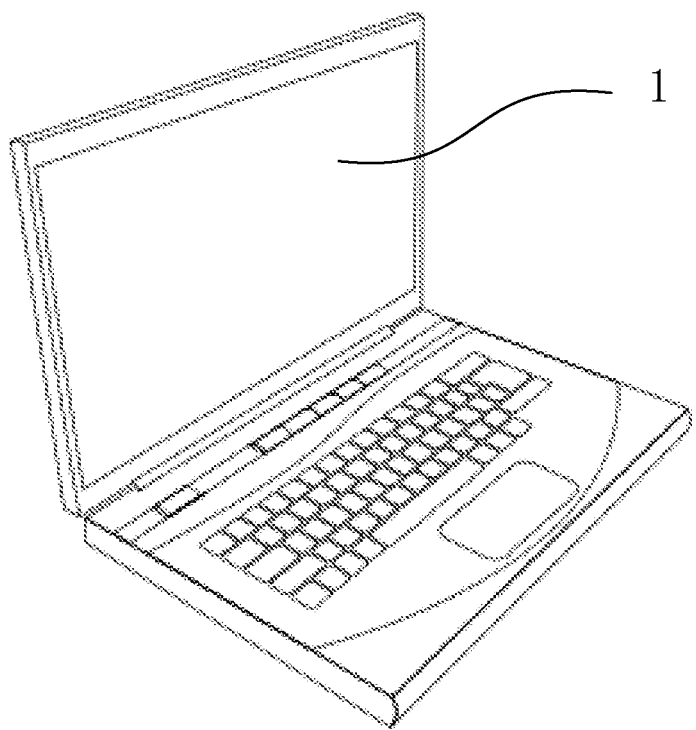
FIG. 8 illustrates a schematic view of an exemplary touch display device according to the disclosed embodiments.

FIG. 8 illustrates a schematic view of an exemplary touch display device according to the present disclosure. Referring to FIG. 8, the touch display device may include an integrated touch control display panel 1 according to the present disclosure. Specifically, the integrated touch control display panel 1 may include a substrate. A plurality of scanning lines and a plurality of data lines may be configured on the substrate. The plurality of the scanning lines may intersect with the plurality of the data lines to form a plurality of pixel units.

The scanning lines may extend in a first direction. The data lines may extend in a second direction. The first direction may be perpendicular to the second direction. The plurality of the pixel units may include a plurality of first pixel units and a plurality of second pixel units that are arranged next to each other along the second direction. Each first pixel unit may include a first pixel electrode. Each first pixel electrode may include a first straight portion and two first bent portions. The two first bent portions may be located on both ends of the first straight portion. Each second pixel unit may include a second pixel electrode. Each second pixel electrode may include a second straight portion and two second bent portions. The two second bent portions may be located on both ends of the second straight portion.

The extension direction of the first straight portion and the extension direction of the second straight portion may be symmetrical with respect to the second direction. The two first bent portions located on both ends of the first straight portion may extend in the same direction. The absolute value of the angle between the extension direction of the first bent portions and the second direction may be greater than the absolute value of the angle between the extension direction of the first straight portion and the second direction. The two second bent portions located on both ends of the second straight portion may extend in the same direction. The absolute value of the angle between the extension direction of the second bent portions and the second direction may be greater than the absolute value of the angle between the extension direction of the second straight portion and the second direction. The extension direction of the first bent portions and the extension direction of the second bent portions may be symmetrical with respect to the second direction.

The touch control display panel according to the present disclosure may include a plurality of the stripe shaped common electrodes. The stripe shaped common electrodes may extend in the second direction and may be sequentially arranged in the first direction. During the touch control phase, the stripe shaped common electrodes may operate as touch control driving electrodes. The touch control display panel according to the present disclosure may also include a plurality of common electrode slits that are located between any two adjacent stripe shaped common electrodes. Each section of the common electrode slit may include a first slit, a second slit, and a connection slit that is located between the first slit and the second slit and connects between the first slit and the second slit.

The first slit may extend in the same direction as the first straight portion extends and the second slit may extend in the same direction as the second straight portion extends. The center line of the first slit and the center line of the neighboring second slit may extend and intersect at a first point. The center line of the first slit may intersect with the center line of the connection slit at a second point. The center line of the second slit may intersect with the center line of the connection slit at a third point. The orthogonal projection of the center line of the connection slit on the substrate may fall inside or coincide with the triangle formed by the orthogonal projection of the first point, the second point and, the third point on the substrate.

In the integrated touch control display panel according to the present disclosure, the orthogonal projection of the center lines of the connection slits on the substrate excluding the end points may coincide with the triangle formed by the orthogonal projection of the first point, the second point, and the third point. Such configuration may widen the gap at the junction where the slits bend to reduce the risk of short circuits between adjacent stripe shape common electrodes, and may ensure the display quality of the display panels. In addition, such configuration may improve the production yield without compromising the display quality.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An integrated touch control display panel, comprising:
   a substrate;
   a plurality of first pixel electrodes including a first straight portion and two first bent portions;
   a plurality of second pixel electrodes including a second straight portion and two second bent portions;
   a plurality of stripe shaped common electrodes sequentially arranged in a first direction and extending in a second direction intersecting with the first direction; and
   a plurality of common electrode slits located between any two adjacent stripe shaped common electrodes, wherein:
   the two first bent portions located on both ends of the first straight portion extend in a same direction;
   the two second bent portions located on both ends of the second straight portion extend in a same direction;
   each section of the common electrode slit includes a first slit, a second slit, and a connection slit located between the first slit and the second slit;
   a center line of the first slit intersects with a center line of the second slit at a first point;
   the center line of the first slit intersects with a center line of the connection slit at a second point;
   the center line of the second slit intersects with the center line of the connection slit at a third point; and
   an orthogonal projection of the center line of the connection slit on the substrate is located inside or coincides with a triangle formed by an orthogonal projection of the first point, the second point and, the third point on the substrate.

2. The integrated touch control display panel of claim 1, further including:
   a plurality of scanning lines extending in the first direction;
   a plurality of data lines extending in the second direction perpendicular to the first direction;
   the plurality of first pixel electrodes in a plurality of first pixel units defined by the intersected scanning lines and data lines; and
   the plurality of second pixel electrodes in a plurality of second pixel units defined by the intersected scanning lines and data line, wherein:
   the first pixel electrodes and the second pixel electrodes are arranged alternately and adjacently along the second direction.

3. The integrated touch control display panel of claim 2, wherein:
   an extension direction of the first straight portion and an extension direction of the second straight portion are symmetrical with respect to the second direction;
   an extension direction of the first bent portions and an extension direction of the second bent portions are symmetrical with respect to the second direction;
   an absolute value of an angle between the extension direction of the first bent portions and the second direction is greater than an absolute value of an angle between the extension direction of the first straight portion and the second direction; and
   an absolute value of an angle between the extension direction of the second bent portions and the second direction is greater than an absolute value of an angle between the extension direction of the second straight portion and the second direction.

4. The integrated touch control display panel of claim 3, wherein:
   the first slit extends in the same direction as the first straight portion extends; and
   the second slit extends in the same direction as the second straight portion extends.

5. The integrated touch control display panel of claim 1, wherein:
   during a touch control phase, the stripe shaped common electrodes operate as touch control driving electrodes.

6. The integrated touch control display panel of claim 1, wherein:
   the connection slit is a straight line; and
   an absolute value of an angle between an extension direction of the center line of the connection slit and the second direction is smaller than an absolute value of an angle between an extension direction of the center line of the first slit and the second direction.

7. The integrated touch control display panel of claim 1, wherein:
the connection slit is a bent line;
an absolute value of an angle between an extension direction of any section of the bent center line of the connection slit and the second direction is smaller than an absolute value of an angle between an extension direction of the center line of the first slit and the second direction; and
an angle between the extension direction of any section of the bent center line of the connection slit and the second direction increases or decreases monotonically.

8. The integrated touch control display panel of claim 1, wherein:
the connection slit is a curved line;
an absolute value of an angle between an extension direction of a tangent line at any point of the curved center line of the connection slit and the second direction is smaller than an absolute value of an angle between an extension direction of the center line of the first slit and the second direction; and
an angle between the extension direction of a tangent line at any point of the curved center line of the connection slit and the second direction increases or decreases monotonically.

9. The integrated touch control display panel of claim 1, wherein:
a width of the connection slit at any point is greater than or equal to a width of the first slit; and
the width of the first slit and a width of the second slit are equal.

10. The integrated touch control display panel of claim 1, wherein:
an orthogonal projection of two end points of the center line of a first straight portion on the substrate forms a first line;
an orthogonal projection of the end points of the center line of a second straight portion on the substrate forms a second line; and
an orthogonal projection of at least one of the second point and third point on the substrate is located between the first line and second line.

11. The integrated touch control display panel of claim 10, wherein:
the orthogonal projection of the neighboring second point and third point on the substrate is located between the neighboring first line and second line.

12. The integrated touch control display panel of claim 2, wherein:
an orthogonal projection of the center line of the first slit and the center line of the second slit on the substrate coincides with an orthogonal projection of the center line of the data line on the substrate.

13. The integrated touch control display panel of claim 1, wherein:
a total number of the first slits and the second slits of each common electrode slit is M, M being a positive integer;
a number of connection slits of each common electrode slit is N, N being a positive integer; and
N≥0.95M.

14. The integrated touch control display panel of claim 1, wherein:
a number of the first slits of each common electrode slit is A;

a number of the second slit of each common electrode slit is B;
A=B; and
A=2K, wherein K is a positive integer.

15. A touch display device including an integrated touch control display panel according to claim 1.

16. An integrated touch control display panel, comprising:
a substrate;
a plurality of pixel units formed at intersections of a plurality of scanning lines extending in a first direction and a plurality of data lines extending in a second direction;
a plurality of stripe shaped common electrodes sequentially arranged in the first direction and extending in the second direction intersecting with the first direction; and
a plurality of common electrode slits located between two adjacent stripe shaped common electrodes of the plurality of stripe shaped common electrodes, wherein:
each stripe shaped common electrode of the plurality of stripe shaped common electrodes corresponds to at least two pixel units of the plurality of pixel units, and the at least two pixel units are arranged adjacently along the second direction;
the two adjacent stripe shaped common electrodes of the plurality of stripe shaped common electrodes are insulated from each other;
each section of the common electrode slit includes a first slit, a second slit, and a connection slit located between the first slit and the second slit;
a center line of the first slit intersects with a center line of the second slit at a first point;
the center line of the first slit intersects with a center line of the connection slit at a second point;
the center line of the second slit intersects with the center line of the connection slit at a third point; and
an orthogonal projection of the center line of the connection slit on the substrate is located inside or coincides with a triangle formed by an orthogonal projection of the first point, the second point and, the third point on the substrate.

17. The integrated touch control display panel according to claim 16, wherein:
during a touch control phase, the stripe shaped common electrodes operate as touch control driving electrodes.

18. The integrated touch control display panel according to claim 16, wherein:
the connection slit is a straight line; and
an absolute value of an angle between an extension direction of the center line of the connection slit and the second direction is smaller than an absolute value of an angle between an extension direction of the center line of the first slit and the second direction.

19. The integrated touch control display panel according to claim 16, wherein:
the connection slit is a bent line;
an absolute value of an angle between an extension direction of any section of the bent center line of the connection slit and the second direction is smaller than an absolute value of an angle between an extension direction of the center line of the first slit and the second direction; and
an angle between the extension direction of any section of the bent center line of the connection slit and the second direction increases or decreases monotonically.

20. The integrated touch control display panel according to claim 16, wherein:

the connection slit is a curved line;

an absolute value of an angle between an extension direction of a tangent line at any point of the curved center line of the connection slit and the second direction is smaller than an absolute value of an angle between an extension direction of the center line of the first slit and the second direction; and an angle between the extension direction of a tangent line at any point of the curved center line of the connection slit and the second direction increases or decreases monotonically.

\* \* \* \* \*